United States Patent [19]

Francis et al.

[11] Patent Number: 5,331,637
[45] Date of Patent: Jul. 19, 1994

[54] MULTICAST ROUTING USING CORE BASED TREES

[75] Inventors: Paul T. Francis, Morristown, N.J.; Anthony J. Ballardie, Alstonefield; Jonathan A. Crowcroft, London, both of England

[73] Assignee: Bell Communications Research, Inc., Livingston, N.J.

[21] Appl. No.: 100,634

[22] Filed: Jul. 30, 1993

[51] Int. Cl.⁵ .......................... H04L 12/44; H04J 3/08
[52] U.S. Cl. ...................................... 370/54; 370/60; 370/94.3
[58] Field of Search .................. 370/94.1, 94.3, 60, 370/54, 16; 340/827

[56] References Cited

U.S. PATENT DOCUMENTS

| | | | |
|---|---|---|---|
| 4,740,954 | 4/1988 | Cotton et al. | 370/60 |
| 5,095,480 | 3/1992 | Fenner | 370/94.1 |
| 5,103,444 | 4/1992 | Leung et al. | 370/60 |

OTHER PUBLICATIONS

Deering, S., "Multicast Routing in Internetworks and Extended LANs" ACM Symposium on Communication Architectures and Protocols, ACM SIGCOMM, pp. 55-64 Aug. 1988.
Wall, D., "Mechanism for Broadcast and Selective Broadcast," Jun. 1980 (PhD) thesis, Stamford University.

Primary Examiner—Douglas W. Olms
Assistant Examiner—Min Jung
Attorney, Agent, or Firm—Leonard C. Suchyta; James W. Falk

[57] ABSTRACT

A method for routing multicast packets in a network is disclosed. A node s101 wishing to join a particular multicast group transmits a packet via a sequence of nodes (r101, r102, r104, r107) including a core node r107 on the multicast tree corresponding to the particular multicast group which the node wishes to join. The packet contains a request to join the particular multicast group and the multicast address of the core node r107 of the multicast tree corresponding to the particular multicast group. The packet is received at each node r101, r102, r104, r107 of the sequence of nodes. Each node r101, r102, r104, r107 which receives the packet writes an address of the node s101, r101, r102, r104 from which the packet was received in an entry of a multicast forwarding table maintained thereat which entry is indexed by the multicast address of the core node r107. If the node r101, r102, r104 which received the packet is not on the multicast tree of the particular multicast group, the node r101, r102, r104 writes an address of the next node r102, r104, r107 of the sequence of nodes in the multicast forwarding table entry indexed by the multicast address of the core node r107. The packet is then retransmitted to the next node r102, r104, r107 of the sequence of nodes.

16 Claims, 8 Drawing Sheets

FIG. 2
(PRIOR ART)
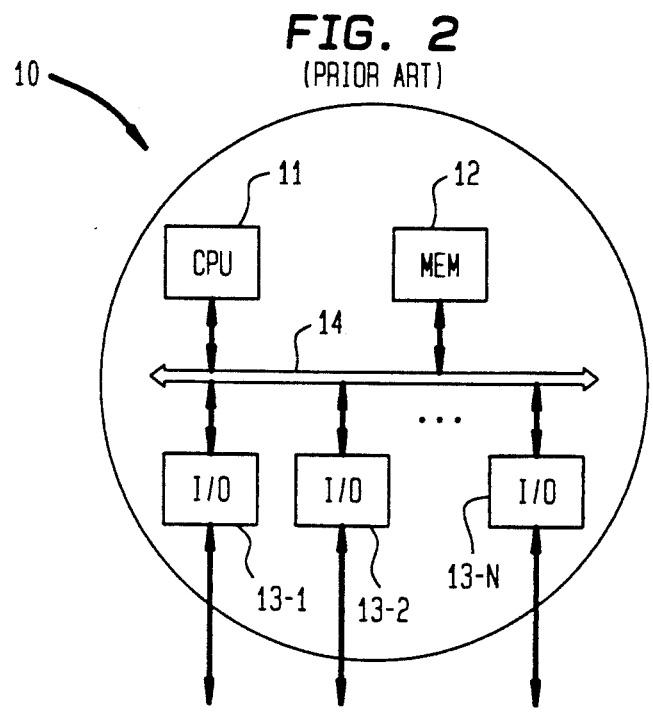
FIG. 3
(PRIOR ART)
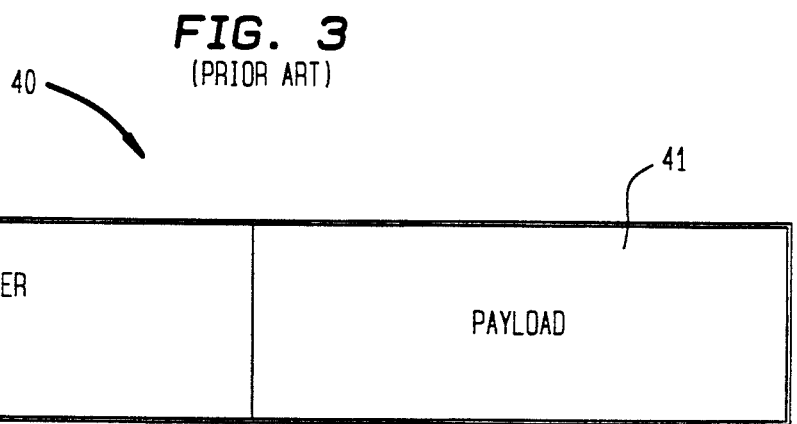
FIG. 4
(PRIOR ART)
| INDEX | NEXT NODE |
|-------|-----------|
| w     | c         |
| x     | b         |
| y     | b         |
| v     | b         |
| z     | b         |
| u     | c         |

FIG. 7

| INDEX | NEXT NODES |
|---|---|
|  |  |
|  |  |
| r107 | s101,r102 |
|  |  |
|  |  |
|  |  |

| INDEX | NEXT NODES |
|---|---|
|  |  |
|  |  |
| r107 | r101,r104 |
|  |  |
|  |  |
|  |  |

| INDEX | NEXT NODES |
|---|---|
|  |  |
|  |  |
| r107 | r102,r107 |
|  |  |
|  |  |
|  |  |

104-50 (top row)
104-51 (r107 row)

FIG. 10

| INDEX | NEXT NODES |
|---|---|
|  |  |
|  |  |
| r107 | r104 |
|  |  |
|  |  |
|  |  |

107-50 (top row)
107-51 (r107 row)

FIG. 11

| INDEX | NEXT NODES |
|---|---|
|  |  |
|  |  |
| r107 | d106,r102 |
|  |  |
|  |  |
|  |  |

103-50 → (top of table)
103-51 → (r107 row)

FIG. 12

| INDEX | NEXT NODES |
|---|---|
|  |  |
|  |  |
| r107 | r101,r103,r104 |
|  |  |
|  |  |
|  |  |

102-50 → (top of table)
102-51 → (r107 row)

FIG. 14

| INDEX | NEXT NODES |
|---|---|
|  |  |
|  |  |
| r106 | d101,r105 |
|  |  |
|  |  |
|  |  |

106-50 → (top of table)
106-51 → (r106 row)

MULTICAST ROUTING USING CORE BASED TREES

RELATED APPLICATIONS

The following patent applications are assigned to the same assignee of the present patent application:
1. U.S. patent application Ser. No. 08/069,275 entitled "General Internet Method for Routing Packets in a Communications Network" filed May 28, 1993 for Paul Tsuchiya, and
2. U.S. patent application Ser. No. 08/033,638 entitled "Method and System for Shortcut Routing over Public Data Networks" filed Mar. 16, 1993 for Paul Tsuchiya.

The above listed patent applications contain subject matter related to the subject matter of this patent application and are incorporated herein by reference.

FIELD OF THE INVENTION

The present invention relates to transmitting information organized into packets between nodes of a communications network. In particular, the present invention relates to multicast routing, or transmitting a single packet to each node of a distinct group of one or more destination nodes called a multicast group. The present invention provides a novel, low-overhead method for constructing and storing one multi-destination delivery route for each distinct multicast group of nodes.

BACKGROUND OF THE INVENTION

An internet communications network 80 is depicted in FIG. 1 including five transit or backbone networks A, B, C, D, and E and three stub networks R, Y, and Z. A "backbone" network is an intermediary network which conveys communicated data from one network to another network. A "stub" network is a terminal or endpoint network from which communicated data may only initially originate or ultimately be received. Each network, such as the stub network R, includes one or more interconnected subnetworks such as I, J, L and M. As used herein, the term "subnetwork" refers to a collection of one or more nodes, e.g., (d), (a) (b, x, y), (q, v) (r, z), (s, u), (e, f, g), (h, i), (j, k, 1), (m, n), and (o, p), interconnected by wires and switches for local internodal communication. Each subnetwork may be a local area network or LAN. Each subnetwork has one or more interconnected nodes which may be host computers ("hosts") u, v, w, x, y, z (shown as triangles in FIG. 1) or routers a, b, c, d, e, f, g, h, i, j, k, l, m, n, o, p, q, r, s (shown as squares in FIG. 1). A host is an endpoint node from which communicated data may initially originate or ultimately be received. A router is a node which serves solely as an intermediary node between two other nodes; the router receives communicated data from one node and retransmits the data to another node.

FIG. 2 shows a block diagram of a host or router node 10. As shown, the node may include a CPU 11, a memory 12 and one or more I/O ports 13-1, 13-2, ..., 13-N connected to a bus 14. Illustratively, each I/O port 13-1, 13-2, ..., 13-N is connected by wires, optical fibers, and/or switches to the I/O port of another node. The I/O ports 13-1, 13-2, ..., 13-N are for transmitting communicated data in the form of a bitstream organized into one or more packets to another node and for receiving a packet from another node. An exemplary packet 40 is shown in FIG. 3 having a payload 41 which contains communicated data and one or more headers 42 which contain control and/or address information.

A host which initially generates a packet for transmission to another node is called the source node and a host which ultimately receives the packet is called a destination node. Communication may be achieved between a single source node and a single destination node using a process called unicast routing. In unicast routing, packets are transferred via a sequence of nodes including the source node, zero or more intermediary nodes, and the destination node, in a bucket brigade fashion. For example, a packet may be communicated from the node w to the node x by transferring the packet from the node w to the node c, to the node d, to the node b, and to the node x. The particular sequence of nodes via which a packet is transmitted is also referred to as a "path". In the above example, one path from the source node w to the destination node x includes the nodes (w,c,d,b, and x).

When a source node transmits a packet to a single destination node, the source node writes the destination address of the packet in a destination address field 43 (FIG. 3) of the header 42. Illustratively, each node of the internet 80 is assigned a unique internet address which is used for identifying the node for purposes of transmitting a packet thereto. The source node then retrieves an entry from a forwarding table, such as the entry 51 of the table 50 shown in FIG. 4, which entry is indexed by the destination address of the packet. (Illustratively, the particular forwarding table 50 shown in FIG. 4 is stored at the node a.) The forwarding table stores a number of entries which entries each contains information for routing a received packet to its ultimate destination. Each indexed entry of the forwarding table indicates the next node on the path to the destination node (where the address of the destination node is used as the index to retrieve the entry). For example, at the node a, the entry 51 indicates that the next node on the path to the node y is the node b. The source node then transmits the packet to the next node on the path indicated by the retrieved entry. This process is repeated at each intermediary node until the packet arrives at the destination node.

Sometimes a source node has a packet to transmit to more than one destination node. For example, the packet may contain an electronic mail or E-mail letter to be delivered to each user of a particular mail group which users are each located at different destination nodes. Alternatively, the packet may contain voice data of a speaking teleconference participant at a source node to be simultaneously delivered to a number of listening teleconference participants located at different destination nodes. Such packets may be transmitted from the source node to each destination node according to a routing procedure depicted in FIG. 5.

FIG. 5 depicts a portion 75 of an internet. As shown in FIG. 5, a packet to be transmitted to a particular group of destination nodes d1, d2, d3, d4, d5, and d6 is transmitted from a source s1 to a first router r1. Illustratively, the router r1 connects the stub containing the source node s1 to the internet 75. The router r1 transmits the packet to the node r2. At the node r2, the packet is transmitted to the destination node d6 via the router r3. In addition, the router r2 transmits a copy of the packet to the router r4. The router r4 receives the copy of the packet and transmits a copy of the received packet to the destination node d1 via the nodes r5 and r6. In addition, the router r4 transmits a copy of the received packet to the router r7. The router r7, transmits a copy of the received packet to the destination node d2 via the router r8. The router r7 transmits a copy of the received packet to the destination node d3 via the routers r9 and r10. In addition, the router r7 transmits a copy of the received packet to the router r11. The router r11 receives the packet and transmits a copy of the received packet to the destination node d4 via the router r12 and a copy of the received packet to the destination node d5 via the router r13.

The packet delivery process shown in FIG. 5 is referred to as multicast routing. In multicast routing, as a packet propagates from router to router, the packet is selectively replicated at certain routers so that sufficient copies of the packet are generated and transmitted to each destination node of a multicast group. Collectively, the paths shown in FIG. 5, i.e., the sequences of nodes which interconnect all of the nodes of a particular group form a tree called a multicast tree. A path of the multicast tree between any two nodes, e.g., the path from the node r2 to the node r11 including the nodes (r2, r4, r7, and r11) is referred to as a branch. There is only one branch on the multicast tree between any two nodes.

There are several conventional methods for implementing multicast routing, in particular, for constructing and maintaining multicast trees. See S. Deering, "Multicast Routing in Internetworks and Extended LANs," ACM Symposium on Communication Architectures and Protocols, ACM SIGCOMM, pp. 55-64, Aug., 1988. Conventionally, multicast tree construction is sender based. That is, for each multicast group, one multicast tree is constructed between each potential source node, i.e., each node that can potentially transmit multicast packets, and the corresponding destination nodes which receive packets from the source node. Appropriate routing information for each pair of a multicast group and a source node is stored at each router on each multicast tree.

In multicast tree construction, the Internet Group Management Protocol ("IGMP") may be utilized for purposes of determining which host nodes in each subnetwork desire to join which multicast groups. According to IGMP, a router node is designated as an interrogator for a subnetwork. The interrogator transmits a query packet over the associated subnetwork to each host. The hosts which receive this query packet respond by indicating of which multicast groups the hosts are members. The interrogator subsequently performs steps according to a multicast tree construction method for attaching itself to each appropriate multicast tree depending on which multicast groups were indicated by the responding host nodes of the subnetwork.

Most nodes are able to distinguish between unicast and multicast packets based on their addresses. In the Internet Protocol ("IP"), the address space is partitioned into unicast addresses and multicast addresses. Each multicast group is assigned one of the multicast addresses. A source node desiring to transmit a packet writes the multicast address of the multicast group and the unicast address of the source node in the packet header. When a node receives a packet with a multicast address, the receiving node utilizes the unicast source address of the source node and the multicast address of the multicast group contained in the packet header to retrieve the set of nodes to which the packet must be transmitted.

One conventional multicast tree construction method is provided in a multicast routing method called Distance-Vector Multicast Routing Protocol ("DVMRP"). This multicast tree construction method uses a modified reverse path forwarding algorithm to construct shortest path, sender-based multicast trees. A multicast tree is constructed according to DVMRP as follows. Initially, a source node transmits the first few multicast packets without using a multicast tree. Instead, the source node transmits the multicast packets in a manner such that a copy of each multicast packet is transmitted via each backbone network. For example, each router which receives one of the first few multicast packets transmits a copy of the packet to each other router attached thereto. Routers which receive these packets may indicate that they are not on a path to a destination node of the multicast group by transmitting a packet containing a special "prune" message to the router from which the multicast packet was received. A particular router may transmit a prune message if:

(1) the particular router is not directly connected to any stub networks containing a node which is a member of the multicast group of the packet, (IGMP may be utilized to determine that each stub has no member nodes of the multicast group) and (2) the particular router is not an intermediary node on a path to a stub network containing a node which is a member of the multicast group of the packet. Such is the case if the particular router receives a prune message from each router to which the particular router transmitted a multicast packet.

For each source node-multicast group pair, each router keeps track of from which routers prune messages have been received. When a router subsequently receives packets transmitted from the same source node to the same multicast group, the router retransmits copies of the packet to only those routers which did not transmit a prune message in previous multicast communications between this source node and multicast group.

Another conventional multicast tree construction method is provided in a multicast routing method called the Link-State Multicast Routing Protocol. According to this multicast tree construction method, each router maintains information regarding each link or each direct connection to another node. In addition, for each link, each router maintains a list of each multicast group having one or more member nodes on that link, i.e., having one or more member nodes connected to the router via that link. Each router disseminates these lists for each multicast group to the other routers of the internet. Furthermore, whenever a new multicast group is added to, or an old multicast group is deleted from a link, (or the nodes interconnected via particular link changes) a designated router on that link transmits a message packet to each other router in the internet indicating the change. Because each router possesses full knowledge of which members of each group are on each link, any router receiving a multicast packet can compute an optimal multicast tree to all routers possessing links with member nodes of the multicast group of the packet. For example, if a router receives a packet from a host, the router will selectively transmit copies of the packet to other routers. Each router which receives a copy of the packet performs a consistent calculation for determining to which routers copies of the packet must be retransmitted therefrom. Invariably, the copies of the packets are received at routers having links with member nodes of the multicast group of the packet. The copies of the packet are then transmitted via the appropriate links to the member nodes.

The conventional methods for constructing multicast trees are disadvantageous in that each utilizes a vast amount of storage space. This is because the conventional methods construct multicast trees which are source node based, i.e., a distinct multicast tree is constructed from each potential source node to the rest of the destination nodes of each multicast group. If there are N groups and S potential source nodes for each multicast group then the storage space requirement at each node is on the order of S×N. In addition, the above-mentioned conventional methods have certain specific disadvantages. In DVMRP, all routers must participate in constructing a multicast tree, even if they do not wish to be part of any multicast tree. Furthermore, the routers in DVMRP utilize a vast amount of processing resources in constructing a tree initially or modifying a tree in the event the internet is reconfigured. Likewise, in Link-State Multicast Routing, each router consumes a large amount of processing resources whenever a designated router transmits a packet to each other router of the internet which packet indicates a change in the internet or group membership. Moreover, in Link-State Multicast Routing, each router must store membership information over the entire internet.

It is an object of the present invention to overcome the disadvantages of the prior art.

SUMMARY OF THE INVENTION

This and other objects are achieved by the present invention which provides a multicast routing method including a core based or central node based multicast tree construction method. In this approach, only one multicast tree is constructed for each multicast group no matter how many potential source nodes exist for the multicast group.

According to one embodiment, one node called the core node is designated for each multicast group. A multicast tree for each multicast group is defined to initially contain only the corresponding core node as the root of the multicast tree. As nodes join the multicast group, branches are constructed from nodes on the tree to the nodes joining the multicast group. Each core node is assigned one unicast address for designating the core node as an ordinary destination of a packet. The core node is also assigned, from the same address space as the unicast addresses, one multicast address for each multicast group for which it is designated the core node. The multicast addresses are used by nodes not on the multicast tree for routing packets the same way as unicast addresses.

The method according to this embodiment enables a particular node to join a particular multicast group as follows. A node that wishes to join a particular multicast group transmits a control packet containing a join request message and the multicast address of the core node corresponding to the particular multicast group. Illustratively, the join request control packet is transmitted towards the core node via zero or more intermediary nodes not already on the multicast tree to a node on the multicast tree according to an existing unicast routing method in the network. Each node which receives the packet writes the address of the node from which the packet was received in an entry of a forwarding table, e.g., the unicast forwarding table, maintained at the receiving node. This entry of the unicast forwarding table is indexed by the multicast address of the core node contained in the packet. If the receiving node is already on the multicast tree, no steps other than the above-mentioned step need be taken. If the receiving node is not already on the multicast tree, then the receiving node also writes the address of the next node of the sequence of nodes in the same forwarding table entry indexed by the multicast address of the core node. (Illustratively, the next node may be determined according to a conventional unicast routing method. That is, the node at which the packet is located retrieves an entry from a unicast forwarding table which entry is indexed by the multicast address of the core node. The retrieved entry indicates the next node on the path to the core node.) The receiving node then retransmits the packet to the next node of the sequence of nodes.

In this process, each node of the sequence not already on the multicast tree of the particular multicast group successively attaches itself to the preceding and next nodes of the sequence thereby forming a branch. Finally, when the packet reaches a node already on the multicast tree, the branch is attached to the multicast tree.

Any source node, whether or not the source node is part of the multicast group, can transmit a data packet to each node that is a member of a particular multicast group as follows. The source node writes the multicast address of the core node corresponding to the particular multicast group in the data packet. The source node then transmits the packet. If the packet is received by a node on the multicast tree, the receiving node retrieves the forwarding table entry indexed by the destination address of the packet, i.e., indexed by the multicast address of the core node. The retrieved entry indicates one or more other nodes on the multicast tree to which copies of the received packet are to be transmitted. The receiving node transmits a copy of the received packet to each node indicated by the retrieved entry, except the node from which the packet was received. This process is repeated at each node of the multicast tree at which each of these copies of the packet is received until each packet arrives at a destination node (which destination nodes are members of the multicast group).

Illustratively, if the packet transmitted by the source node is received at a node which is not part of the multicast tree, the receiving node simply treats the packet as an ordinary unicast packet. That is, the receiving node attempts to route the packet in a conventional fashion to the core node using the destination address of the packet (the multicast address of the core node) as a unicast address. Invariably, the packet arrives at a node on the multicast tree which node transmits the packet as described above.

In short, a core based multicast routing method is disclosed in which one or more core nodes are designated as a reference for constructing one multicast tree for each multicast group. The multicast routing method according to the invention conserves storage space and processing resources at each node.

BRIEF DESCRIPTION OF THE DRAWING

FIG. 2 depicts a conventional node.

FIG. 3 depicts a conventional packet.

FIG. 4 depicts a conventional forwarding table.

FIG. 7 depicts a forwarding table at a node of the internet of FIG. 6 in the process of being added to a multicast tree.

FIG. 8 depicts a forwarding table at another node of the internet of FIG. 6 in the process of being added to a multicast tree.

FIG. 9 depicts a forwarding table at yet another node of the internet of FIG. 6 in the process of being added to a multicast tree.

FIG. 10 depicts a forwarding table at a core node of a multicast tree in the internet of FIG. 6.

FIG. 11 depicts a forwarding table at a node of the internet of FIG. 6 in the process of being added to a multicast tree.

FIG. 12 depicts a forwarding table of a node on a multicast tree to which the node having the forwarding table depicted in FIG. 11 is being added.

FIG. 14 depicts a forwarding table at a node of the internet depicted in FIG. 13 in the process of routing a multicast packet.

DETAILED DESCRIPTION OF THE INVENTION

According to the present invention, a single multicast tree is constructed for each multicast group. Each multicast group is initially assigned a core node which serves as the root of the corresponding multicast tree. This multicast tree design philosophy parallels an analogous approach studied for low-delay broadcasting and selective broadcasting. See D. Wall, "Mechanism for Broadcast and Selective Broadcast," June 1980 (PhD thesis, Stanford University).

Figure 1:
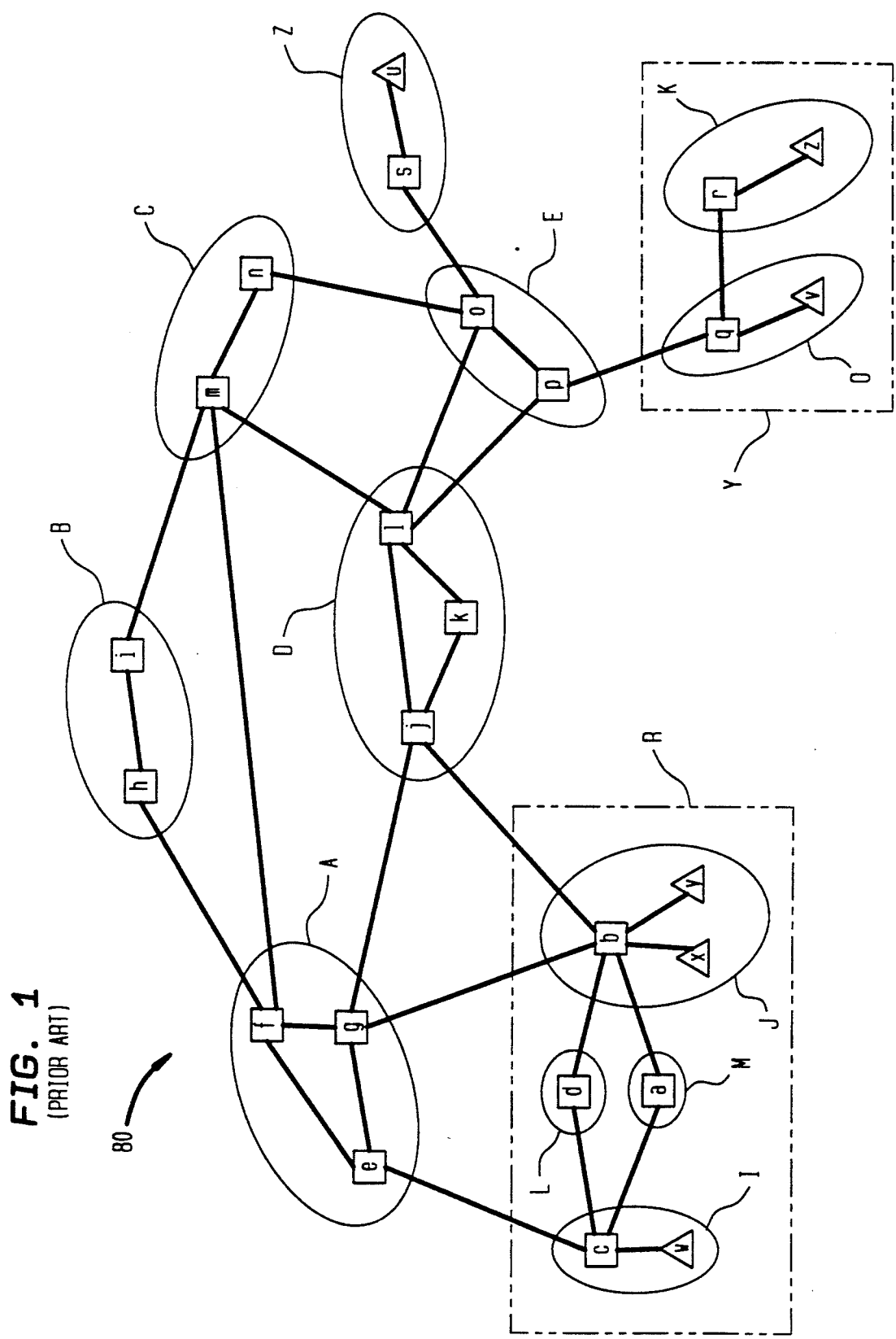
FIG. 1 depicts a conventional internet communications network.
Figure 5:
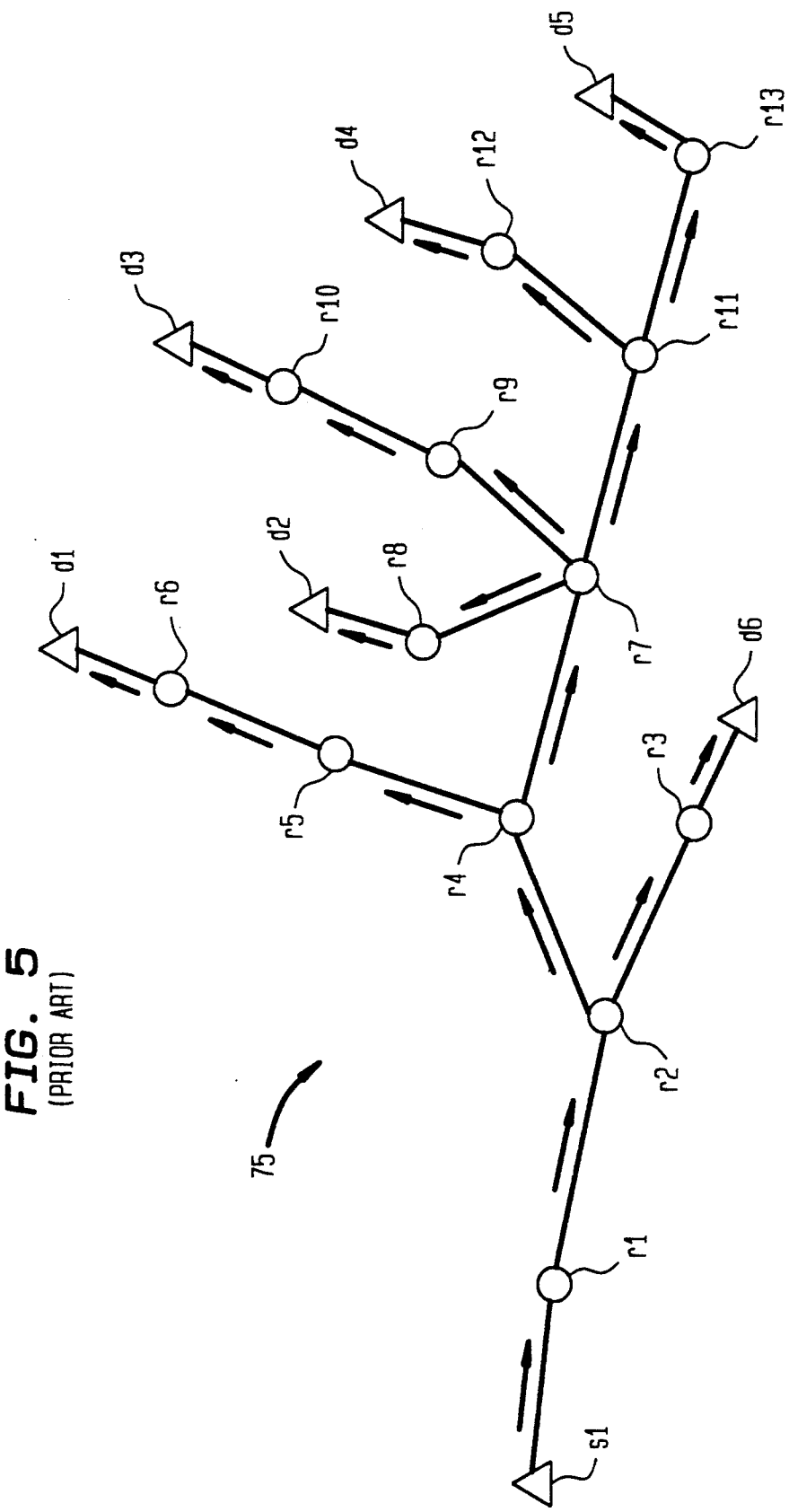
FIG. 5 illustrates a multicast tree.
Figure 6:
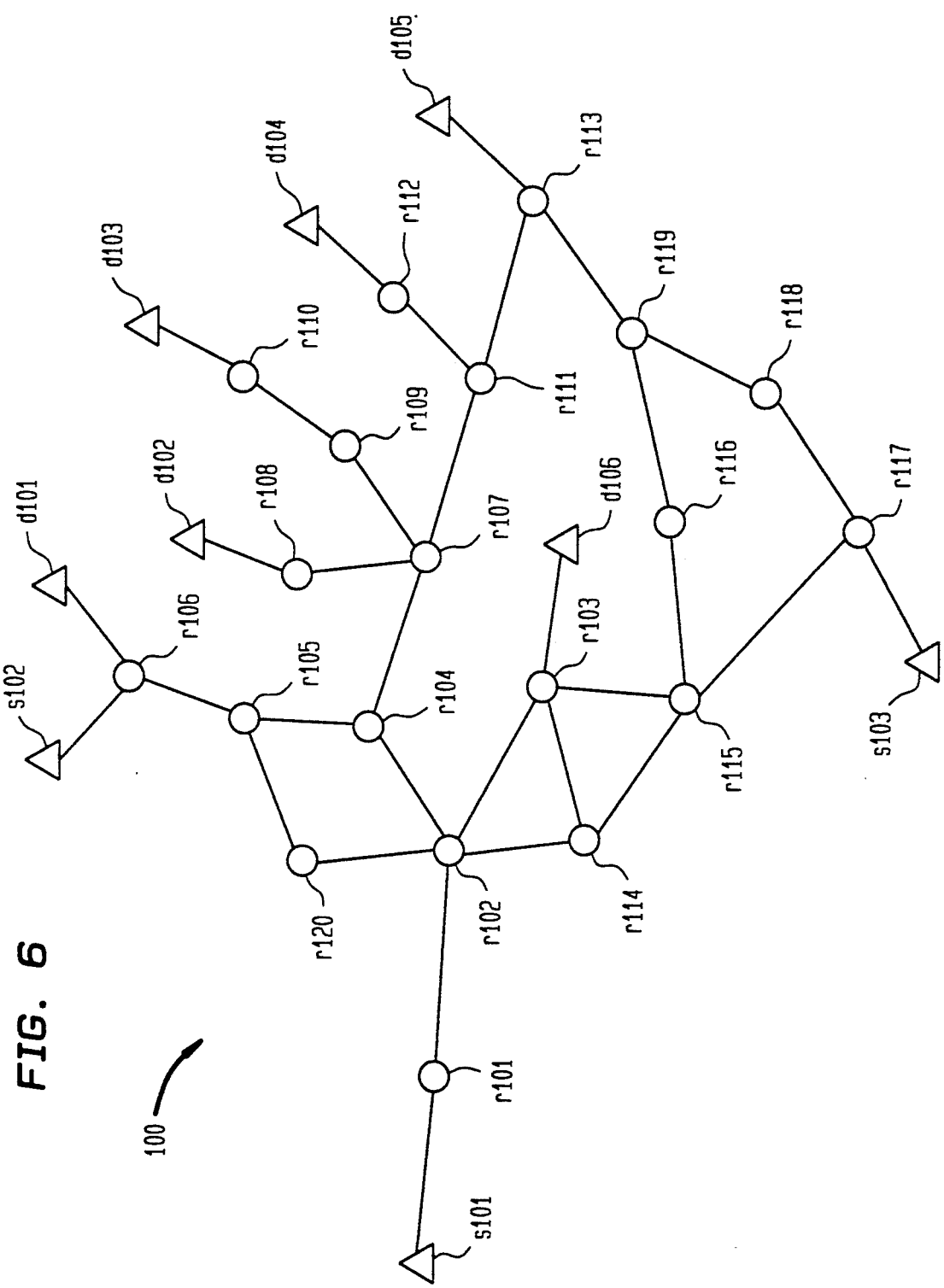
FIG. 6 depicts an internet according to the present invention.

FIG. 6 depicts an internet 100 according to the present invention including a number of router nodes r101, r102, r103, r104, r105, r106, r107, r108, r109, r110, r111, r112, r113, r114, r115, r116, r117, r118, r119, and r120 and a number of host nodes d101, d102, d103, d104, d105, d106, s101, s102, and s103. Illustratively, a particular multicast group is formed for which the node r107 is designated the core node. The core node may be selected to be centrally located with respect to the anticipated member nodes of the multicast group although this is not necessary. The node r107 is assigned two addresses from the unicast address space. One address is used for unicast routing, the other for multicast routing. If the core node r107 receives a packet containing the unicast address of the core node r107 in the destination address field of the header of the packet, the packet is simply received as per conventional unicast routing.

Initially, the core node r107 is the only node on the multicast tree of the associated multicast group. All nodes according to the invention maintain a state indicating whether or not they are on a particular multicast tree of each multicast group. Thus, initially, the node r107 is the only node with a state indicating that it is on the multicast tree associated with the aforementioned particular multicast group. As nodes join the multicast group, branches are formed leading from a node currently on the multicast tree to each node joining the group.

The formation of these branches is now discussed by way of example. Suppose the node s101 wishes to join the particular multicast group for which the node r107 has been designated the core node. Illustratively, the node s101 is a host node. A host node illustratively communicates a request to join the particular multicast group to a designated router. Suppose the router r101 is the designated router for the node s101. In response to detecting a request by the source node s101 to join a particular multicast group, the router r101 illustratively generates a join request control packet containing the multicast address of the node r107 in the destination address field of the packet and a join request message. The node r101 may illustratively consult a directory to determine the multicast address of the node r107 if not already known.

The node r101 is not yet on the multicast tree of the multicast group which the node s101 wishes to join. Thus, the node r101 illustratively changes its state to indicate that it is in the process of being added to a multicast tree of the multicast group that the node s101 wishes to join. The node r101 determines the next node on the path to the core node r107, e.g., by retrieving from a unicast forwarding table (not shown) maintained at the node r101 the entry indexed by the multicast address of the core node r107. As depicted in FIG. 7, the node r101 then writes the address of the node s101 and the next node, e.g., the node r102, in a forwarding table entry 101-51 indexed by the multicast address of the core node contained in the join request control packet. Illustratively, the forwarding table 101-50 may be the same unicast forwarding table in which unicast addresses are maintained or a separate multicast forwarding table maintained at the node r101. The node r101 then transmits the join request control packet to the node r102.

Like the node r101, the node r102 is not yet on the multicast tree of the multicast group which the node s101 wishes to join. Thus, when the join request control packet is received at the node r102, the node r102 executes a similar sequence of steps as executed by the node r101. The node r102, changes its state to indicate that it is in the process of being added to the multicast tree of the particular multicast group that the node s101 wishes to join. The node r102 determines the next node on the path to the core node 107, e.g., the node r104. As depicted in FIG. 8, the node r102 then writes the addresses of the nodes r101 and the next node r104 in the entry 102-51 indexed by the multicast address of the core node 107 of a forwarding table 102-50 maintained at the node r102. The node r102 then transmits the join request control packet to the node r104.

As with the nodes r101 and r102, the node r104, is not yet on the multicast tree of the multicast group which the node s101 wishes to join. Thus, when the join request control packet is received at the node r104, the node r104 changes its state to indicate that it is in the process of being added to the multicast tree for this multicast group. The node r104 determines the next node on the path to the core node r107 which is the core node 107 itself. As depicted in FIG. 9, the node r104 then writes the addresses of the node r102 and the next node r107 in an entry 104-51 of a forwarding table 104-50 maintained at the node r104 which entry 104-51 is indexed by the multicast address of the core node 107. The node r104 then transmits the join request control packet to the core node r107.

The core node r107 is on the multicast tree of the multicast group which the node s101 wishes to join. The core node r107 maintains a "core node" status for this multicast group indicating, among other things, that the core node r107 is on the appropriate multicast tree. As depicted in FIG. 10, upon receiving the join request control packet, the core node r107 writes the address of the node from which the packet was received, i.e., the node r104, in an entry 107-51 of a forwarding table 107-50 maintained at the node r107 which entry 107-51 is indexed by the multicast address of the core node r107. Furthermore, because the core node r107 is on the multicast tree, the core node r107 responds to the join request control packet by transmitting a join acknowledgement control packet. That is, the core node r107 generates a join acknowledgement control packet containing a join acknowledge message and transmits this packet to the node from which the join request control packet was received, i.e., the node r104.

The node r104 receives the join acknowledgement control packet and changes its state to indicate that it is on the multicast tree for the multicast group corresponding to the core node r107. The node r104 then transmits the join acknowledgement control packet to the node from which it had received the join request control packet, i.e., the node r102. Likewise, upon receiving the join acknowledgement control packet, the node r102 changes its state to indicate that it is on the multicast tree for the multicast group corresponding to the core node r107. The node r102 also transmits the join acknowledgement control packet to the node from which it received the join request control packet, namely, the node r101. The node r101 then changes its state to indicate that it is on the multicast tree corresponding to the particular multicast group. At this point, the branch is completed. The multicast delivery tree for the group containing the node s101 includes the nodes r101, r102, r104, and r107.

Suppose that after the node s101 joins the multicast group corresponding to the core node r107, the node d106 decides to join the multicast group. As above, the node d106 communicates a request to join a particular multicast group to a designated router. Illustratively, the node r107 serves as the designated node for maintaining multicast group memberships of the nodes in a stub network including the host d106. The node r107 detects a request by the node d106 to join the multicast group corresponding to the core node r107. The node r103 is not yet on the multicast tree for this multicast group. Thus, the node r103 changes its state to indicate that it is in the process of being added to the multicast tree of the particular multicast group that the node d106 wishes to join. As before, the node r103 generates a join request control packet containing the multicast address of the core node r107. The node r103 determines the next node on the path to the core node 107, e.g., the node r102. As shown in FIG. 11, the node r103 writes the address of the node d106 and the next node r102 in the entry 103-51 of a forwarding table 103-50 maintained at the node r103 which entry is indexed by the multicast address of the core node r107. The node r103 then transmits the join request control packet to the node r102.

The node r102 is already on the multicast tree for this multicast group (the node r102 maintains a state indicating that it is on the multicast tree for this multicast group). Thus, as shown in FIG. 12, the node r102 merely adds the address of the node from which the join request control packet was received (i.e., the node r103) to the entry 102-51 of the forwarding table 102-50 indexed by the multicast address of the core node 107. The node r102 then generates a join acknowledgement control packet containing a join acknowledge message and transmits this packet to the node r103. The node r103 receives the join acknowledgement control packet and changes its state to indicate that it is on the multicast tree for the multicast group corresponding to the core node r107.

Figure 13:
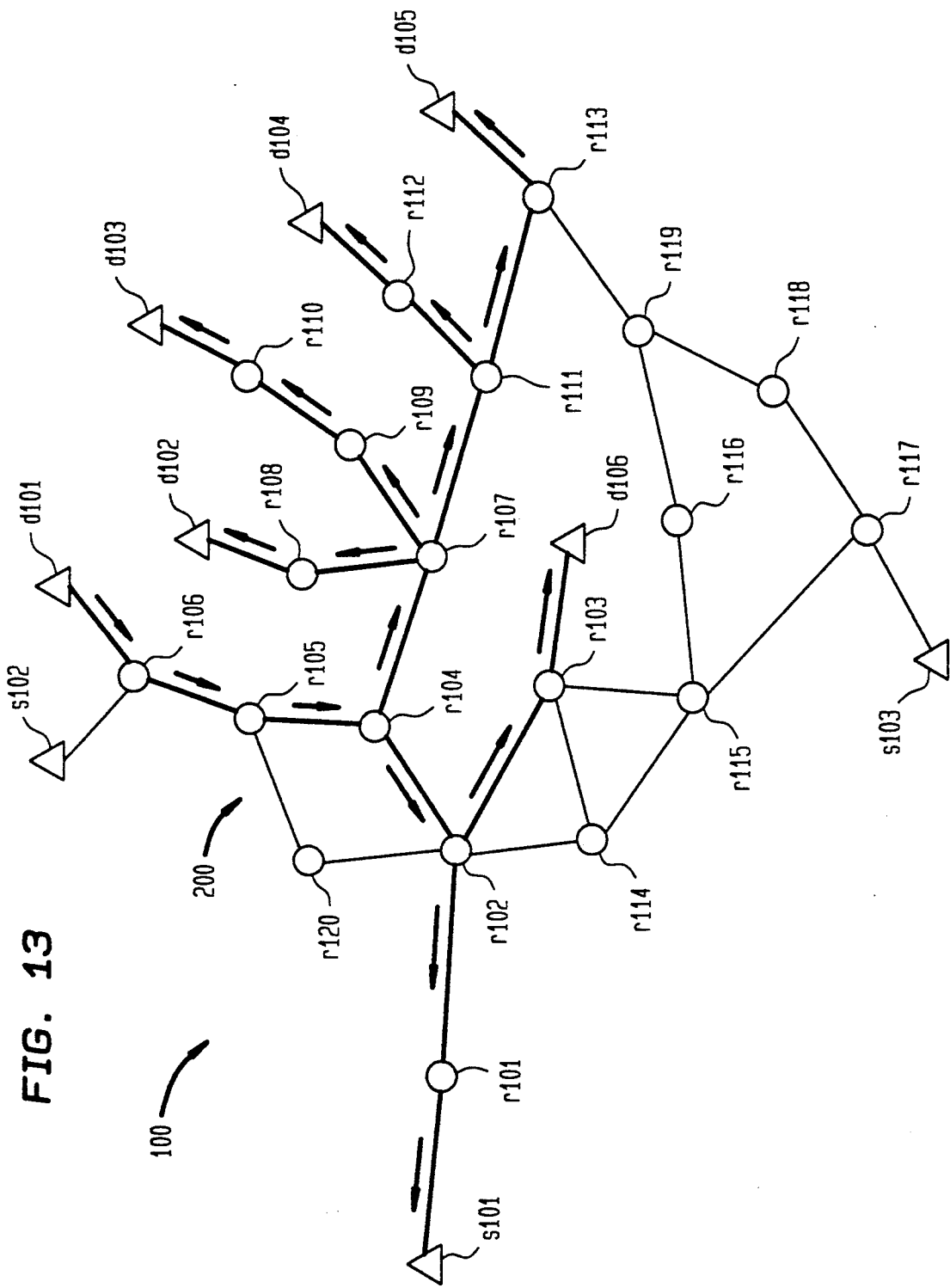
FIG. 13 illustrates the routing of a multicast packet using a multicast tree in an internet according to the present invention.

Referring to FIG. 13, the multicast routing of data packets in the internet packet is now discussed by way of example. The multicast routing method according to the present invention is very similar to the conventional multicast routing method. Only a single multicast tree is used for each multicast group of nodes regardless of which node or nodes serves as the source node of the multicast data packets.

Suppose that the aforementioned multicast group includes the nodes s101, d101, d102, d103, d104, d105, and d106. Also, suppose that the multicast tree 200, having the core node r107, is constructed for delivering packets to each of these nodes. Furthermore, suppose the node d101 wishes to transmit a multicast data packet to the multicast group of the multicast tree 200. The node d101 generates a data packet containing the data the node d101 wishes to send and also containing the multicast address of the core node r107 in the destination field of the packet. The node d101 then transmits this data packet to the node r106. Illustratively, the node d101 is part of a stub network connected to the internet via the node r106 and thus, transmits all packets destined to nodes outside the stub in which the node d101 is contained via the node r106.

As shown in FIG. 14, when the node r106 receives the data packet from the node d101, the node r106 retrieves the entry 106-51 in a forwarding table 106-50 maintained thereat indexed by the address contained in the destination address field of the data packet (the multicast address of the core node r107). As shown, this retrieved entry contains the address of the nodes d101 and r105. The node r106 then transmits a copy of the data packet to each node indicated by the retrieved entry except the node from which the packet was received. Thus, the node r106 transmits a copy of the data packet to the node r105.

When the data packet is received at the node r105, the node r105 carries out similar steps. The node r105 retrieves the entry of a forwarding table maintained at the node r105 which entry is indexed by the multicast address of the core node r107 (contained in the destination address field of the received data packet). The retrieved entry illustratively contains the addresses of the nodes r106 and the node r104. The node r105 then transmits a copy of the data packet to each of these nodes except the node from which the data packet was received, i.e., to the node r104.

When the data packet is received at the node r104, the node r104 retrieves the entry indexed by the multicast address of the core node r107 from a forwarding table maintained thereat. This retrieved entry contains the addresses of three nodes r102, r107, and r105. The node r104 then transmits a copy of the data packet to each of these nodes except the node from which the data packet was received. That is, the node r104 transmits a copy of the data packet to the node r102 and a copy of the data packet to the node r107.

The node r102 receives a copy of the data packet and transmits a copy of the received data packet to the node r103 and a copy of the received data packet to the node r101. The copy of the data packet transmitted to the node r101 is transmitted to the node s101 and the copy of the data packet transmitted to the node r103 is transmitted to the node d106. The core node r107 receives a copy of the data packet and transmits a copy of the received data packet to the node r108, a copy to the node r109 and a copy to the node r111. The copy of the data packet transmitted to the node r108 is retransmitted to the node d102 and the copy of the data packet transmitted to the node r109 is retransmitted to the node r110 and then retransmitted again to the node d103. The node r111 retransmits a copy of the received data packet to the node r112 (which is retransmitted to the node d104) and a copy of the data packet to the node r113 (which is retransmitted to the node d105).

It is also possible for a source node that is not a member of the multicast group to transmit a data packet to each member of the multicast group. For example, suppose the node s103 wishes to transmit a data packet to the multicast group corresponding to the multicast tree 200. The node s103 generates a data packet containing the multicast address of the core node r107 in the destination address field of the data packet. The node s103 then transmits the data packet to the node r117. Illustratively, the node s103 is in a stub network which is connected to the internet packet only by the node r117. Thus, the node s103 transmits all nodes destined to nodes outside this stub network to the node r117.

Illustratively, the node r117 is not on the multicast tree associated with the multicast group to which the data packet transmitted from the node s103 is destined. It is possible that the node r117 is adapted according to the invention (i.e., is capable of joining a multicast tree) but never received a join request control packet. Alternatively, the node r117 is not adapted according to the present invention. Nevertheless, the node r117 can forward the data packet. The node r117 treats the data packet as an ordinary unicast packet and attempts to retransmit the data packet according to some conventional unicast routing method. This is possible because the multicast addresses are drawn from the same address space as the unicast addresses. For example, the node r117 retrieves an entry from a (unicast) forwarding table maintained thereat which entry is indexed by the destination address of the data packet (which is the multicast address of the core node r107). The node r117 then retransmits the data packet to the node indicated by the retrieved entry. For example, the retrieved entry may indicate the node r115. This indicated node r115 is the next node on a unicast path to the core node r107.

The node r115 is also not on the multicast tree 200. Like the node r117, the node r115 routes the data packet according to a conventional unicast algorithm. Illustratively, the node r115 retrieves the entry of a forwarding table maintained at the node r115 indexed by the destination address of the data packet. Illustratively, this entry indicates the node r103. The node r115 then transmits the data packet to the node r103.

The node r103 is on the multicast tree 200 of the multicast group to which the data packet is destined. Thus, the node r103 carries out similar steps described above. That is, the node r103 retrieves the entry from its forwarding table indexed by the multicast address of the core node r107 stored in the destination address field of the packet. The node r103 then transmits a copy of the data packet to each node indicated in the retrieved entry except a node from which the packet was received. In this case, the retrieved entry indicates the nodes d106 and r102. The data packet was not received from either of these nodes. Thus, the node r103 transmits a copy of the data packet to the node d106 and a copy of the data packet to the node r102. The data packet is then transmitted via the multicast tree 200 to the other nodes s101, d101, d102, d103, d104, and d105 which are members of the multicast group in the above described fashion.

As discussed below, a node may desire to remove itself from the multicast tree. Illustratively, a particular node may remove itself from a multicast tree of a particular multicast group if and only if:

(1) the particular node is not directly connected to any nodes that are members of the particular multicast group, and (2) the particular node has received a quit request message from each node directly connected thereto except the next node on the branch from the particular node to the core node. (As stated above, there is only one branch, i.e., path on the multicast tree, between any two nodes on the multicast tree)

A node which satisfies the above criteria may generate a quit request control packet containing the multicast address and a "quit-request" message. The node transmits the quit request control packet to the next node on the branch to the core node. The quit request control packet is received at the next node which deletes the address of the requesting node from the forwarding table entry indexed by the multicast address of the core node. Furthermore, the next node transmits a quit acknowledgement control packet containing a "quit-acknowledge" message and the multicast address of the core node to the node requesting to be removed from the tree. Upon receiving the quit acknowledgement control packet, the node desiring removal from the multicast tree may delete the entry indexed by the multicast address of the core node from its forwarding table.

At times, a non-core node on a branch of the multicast tree may fail. Another node connected to the failed node which other node is not on the branch between the failed node and the core node may detect the failure. This other node may transmit a flush tree control packet containing a "flush-tree" message and the multicast address of the core node to each node connected to the node which detected the failure (except the failed node). Nodes which receive such a flush tree control packet may reattempt to attach themselves to the multicast tree in the above described manner.

Alternatively, auxiliary core nodes are provided in the event of a failure. Illustratively, in this arrangement a single core based multicast tree may initially have a primary core node and one or more auxiliary core nodes. Each auxiliary core node is assigned a unicast address and a unique multicast address. Furthermore, the auxiliary core nodes are assigned a priority in decreasing order. Initially each auxiliary core node attempts to establish a path to the primary core node, e.g., by transmitting a join request control packet as described above. If a particular auxiliary core node is unsuccessful in establishing a path to the primary core node, the particular auxiliary core node attempts to establish a path to each auxiliary core node in decreasing order of priority until a path is established to another auxiliary core node. While attempting to form such a path, an auxiliary core node may receive a join request control packet generated by some other node. In such a case, the auxiliary core node transmits a redirect control packet to the node which initially generated the received join request control packet. The redirect control packet transmitted from the auxiliary core node contains a message indicating that no packets should be transmitted to this auxiliary core node.

If auxiliary core nodes are provided, the particular node connected to a failed node may elect not to inform each other node of the failure. Instead, the particular node may attempt to rejoin the multicast tree by transmitting a join request control packet to each auxiliary core node in descending priority until the particular node successfully rejoins the multicast tree.

In the multicast tree construction process described above, a branch is formed by transmitting a "join request" control packet from a node that wishes to join a multicast group to the multicast tree and by transmitting a "join acknowledgement" control packet in the other direction. It is also possible to transmit only the join request control packet. Each intermediary node not already on the multicast tree which receives the join request control packet changes directly to a state indicating that it is on the multicast tree for the particular multicast group. However, the request-acknowledgement process described above provides the ability to prevent loops from occurring amongst the nodes which deliver the multicast packets. A loop is a circular path which causes a packet to return to node on the path from which node the packet has already been transmitted. Generally, most unicast algorithms provide for loop prevention in forming the unicast routing paths between each node (which paths are stored in the forwarding tables of the nodes). Occasionally, the interconnection of nodes in the internet packet is modified after these paths are determined so that a loop is created. Most unicast algorithms eventually detect and remove such loops by revising the paths containing these loops. Because such loops are short lived, they are referred to as transient loops.

Such transient loops can disrupt the construction of multicast trees by introducing loops in the multicast delivery paths. There are three cases to consider:

(1) A join request control packet is transmitted via a transient loop containing only nodes not on the multicast tree. In this case, the join request control packet never arrives at a node already on the multicast tree and thus no join acknowledge message is sent.

(2) A join request control packet is transmitted from a node not on the multicast tree nor attempting to rejoin the multicast tree (for example, as a result of a node failure) via a transient loop including some nodes already on the multicast tree and at least one node not already on the multicast tree. In this case, the node of the multicast tree which receives the join request control packet transmits a join acknowledgement control packet back to the node wishing to join the multicast tree. No further action is required because a loop free path exists from the node wishing to join the multicast tree to the multicast tree.

(3) A join request control packet is transmitted from a node attempting to rejoin a tree via a transient loop including only nodes already on the multicast tree. If a node on the multicast tree responded to such a packet, a loop would form. Thus, a loop detection mechanism is required for this specific case.

Illustratively, loop detection is achieved as follows. A join request control packet illustratively also has an active flag and a rejoin flag. The purpose of the active flag is to indicate whether or not the join request control packet has been received by a node on the multicast tree. A node not already on the multicast tree which generates a join request control packet sets the active flag to indicate that the join request control packet has not yet been received by a node on the multicast tree. The active flag is cleared when the join request control packet arrives at a node already on the multicast tree.

The purpose of the rejoin flag is to indicate that the node which generated the join request control packet is attempting to rejoin the multicast tree, for example, to circumvent a failed node on the branch to the core node. When a node rejoins the multicast tree, the node transmits a join request control packet with the rejoin flag set to indicate that the node is attempting to rejoin the multicast tree (and the active flag cleared to indicate that the join request control packet has not yet been received by a node on the multicast tree). If a node on the multicast tree receives a join request control packet with a cleared active flag and a set rejoin flag, the node retransmits the join request control packet to each node on the multicast tree connected thereto except the node from which the packet was received.

Thus, when a node attempts to rejoin a multicast tree, the node generates a join request control packet with a set active flag and a set rejoin flag. When the packet is received at a node on the multicast tree, the receiving node clears the active flag and transmits a join acknowledgement control packet back to the node which generated the join request control packet. Furthermore, because the rejoin flag is set, the receiving node retransmits a copy of the join request control packet to each node on the multicast tree connected thereto. Each node on the multicast tree which receives a copy of the join request control packet retransmits a copy of the received packet to each node on the multicast tree connected thereto (except the node from which the packet was received).

If the join request control packet returns to the node wishing to rejoin the multicast tree (which originally generated and transmitted the join request control packet) then a loop exists including only nodes on the multicast tree. In such a case, the node wishing to rejoin the tree must transmit a quit request control packet. After the passage of time, the transient loop may be removed from the internet. Thus, the node wishing to rejoin the multicast tree may reattempt to rejoin the multicast tree after waiting some period of time.

In the above examples, only one core is designated as the primary core of each multicast tree. It is also possible to designate several primary cores, particularly if many of the member nodes of the multicast group are separated by many intervening nodes in the internet. Illustratively, each primary core node is strategically placed in the vicinity of dense populations of multicast group members. Each primary core must be connected to at least one other primary core and elaborate connection maintenance protocols may be provided for detecting and repairing connection failures. However, because complex failure scenarios are possible, it is more desirable to provide single core node trees.

In another embodiment, only a unicast address is assigned to the core node from the single address space. A multicast address is assigned to the multicast group from another address space. In this embodiment, the multicast address is not initially written in the destination address field of a multicast control or data packet.

This is because not every node of the internet (in particular, nodes not adapted according to this embodiment of the present invention) will be able to route the packet using the multicast address of the multicast group. Instead, the node generating the packet writes the unicast address of the core node in the destination address field and the multicast address in an options field of the packet header. Thus, the data packet initially contains two addresses. When the packet is received at a node already on the multicast tree, the receiving node writes the multicast address (contained in the options field of the packet) in the destination address field of the packet. The nodes on the multicast tree then use the multicast address to route the packet. Otherwise, the above multicast tree construction and multicast routing processes are the same as discussed above.

In short, a core based multicast routing method is disclosed in which a single multicast tree is constructed for each multicast group of nodes. Initially, the multicast tree includes only a single core node which is assigned a unicast address and a multicast address. A branch to a node wishing to join the multicast group is formed by transmitting a join request control packet containing a join request message and the multicast address of the core node via a sequence of nodes. Each node of this sequence writes the address of the previous and next nodes of the sequence in an entry of a multicast forwarding table maintained thereat indexed by the multicast address of the core node. A multicast data packet can then be routed using the multicast tree by transmitting the data packet to the multicast tree containing the multicast address of the packet. Each node on the multicast tree then retransmits a copy of the data packet to each node indicated by the entry in the forwarding table thereat indexed by the multicast address of the packet. The multicast routing method according to the present invention greatly reduces the storage requirements at each node.

Finally, the present invention has been described above with reference to illustrative embodiments. Numerous other embodiments may be devised by those having ordinary skill in the art without departing from the spirit and scope of the following claims.

We claim:

1. A method for enabling a particular node to join a particular multicast group of nodes in a network comprising a plurality of nodes, said method comprising the steps of:
   transmitting from said particular node a join request control packet indicating a multicast address of a core node on a multicast tree corresponding to said multicast group,
   receiving said join request control packet at another node,
   writing an address of the node from which said join request control packet was received in an entry of a forwarding table maintained at said other node, which entry is indexed by said multicast address of said core node, and
   if said other node is not already on said multicast tree of said particular multicast group, writing an address of a next node on a path to said core node in said forwarding table entry indexed by said multicast address of said core node and retransmitting said packet from said other node to said next node.

2. The method of claim 1 further comprising the step of:
   retrieving an entry from a unicast forwarding table maintained at said other node, which entry is indexed by said multicast address of said core node, wherein said retrieved entry indicates said next node on said path to said core node.

3. The method of claim 1 further comprising the step of:
   deleting a specific node on said multicast tree by transmitting from said specific node to an adjacent node on a branch to said core node a quit request control packet requesting to be deleted from said multicast tree.

4. The method of claim 3 wherein said specific node requests to be deleted from said multicast tree if said specific node is not directly connected to any nodes which are members of said particular multicast group, and if said specific node is not on a path between a member of said particular multicast group and said core node.

5. The method of claim 3 further comprising the step of:
   at said adjacent node, deleting an address of said specific node from an entry of a forwarding table maintained at said adjacent node.

6. The method of claim 1 wherein said multicast tree includes one or more interconnected auxiliary core nodes connected to said core node, said auxiliary core nodes being assigned a priority in descending order, said method further comprising the step of:
   (a) if a specific node on said multicast tree detects a failed node on a branch to said core node, transmitting from said specific node a join request control packet to said auxiliary core node having the highest priority, and p1 repeating step (a) for each auxiliary core node in descending priority until said specific node rejoins said multicast tree.

7. The method of claim 1 further comprising the step of:
   if a specific node on said multicast tree detects a failure on a branch to said core node, transmitting a flush tree control packet to each other node on said multicast tree connected to said specific node to cause said other nodes to rejoin said multicast tree.

8. The method of claim 1 wherein said packet transmitted from said particular node indicates that said particular node is rejoining said multicast tree and said method further comprises the steps of:
   detecting at said particular node wishing to rejoin said multicast tree, a loop including only nodes on said multicast tree, and
   transmitting to a next node on a branch to said core node a quit request control packet to eliminate said loop.

9. The method of claim 8 further comprising the step of:
   if said join request control packet transmitted from said particular node returns to said particular node, determining that a loop exists including only nodes on said multicast tree.

10. The method of claim 8 further comprising the steps of:
    receiving said join request control packet at said other node already on said multicast tree, and
    retransmitting a copy of said received join request control packet to each other node on said multicast tree connected to said other node.

11. The method of claim 1 wherein said multicast tree comprises a plurality of core nodes which each have a unique multicast address.

12. A method for enabling a particular node to join a particular multicast group of nodes in a network, said multicast group having a multicast tree including a core node, said method comprising the steps of:
   transmitting a join request control packet containing a multicast address of said core node from said particular node to a node already on said multicast tree using unicast routing,
   at said node already on said multicast tree, writing an address of the node from which said join request control packet was received in an entry of a forwarding table maintained at said node already on said multicast tree, which entry is indexed by said multicast address of said core node, and
   transmitting a join acknowledgement control packet to said particular node.

13. The method of claim 12 further comprising the step of:
   prior to receiving said join request control packet at said node already on said multicast tree, receiving said packet at a node not yet on said multicast tree, writing in an entry of a forwarding table maintained at said node not yet on said multicast tree, which entry is indexed by said multicast address of said core node, an address of the node from which said join request control packet was received and an address of a next node on a path to said node already on said multicast tree, and
   transmitting said join request control packet to said next node.

14. The method of claim 13 further comprising the steps of:
   receiving said join acknowledgement control packet at said node not yet on said multicast tree,
   maintaining a state indicating that said node not yet on said multicast tree is on said multicast tree, and
   retransmitting said join acknowledgement packet to said particular node.

15. A method for transmitting a data packet to a multicast group of nodes in a network using a multicast tree of nodes associated with said group comprising the steps of:
   at each node on a multicast tree corresponding to said multicast group, retrieving an entry from a forwarding table maintained at each node and indexed by a multicast address of a core node indicated by said data packet, and transmitting a copy of said data packet to each node indicated by said retrieved entry except a node from which said packet was received.,
   said multicast tree having been constructed by the steps of:
   transmitting from a particular node wishing to join said particular multicast group a join request control packet indicating a multicast address of said core node, receiving said join request control packet at another node, writing an address of the node from which said join request was received in an entry of a forwarding table maintained at said other node, which entry is indexed by said multicast address of said core node, and if said other node is not already on said multicast tree of said particular multicast group, writing an address of a next node on a path to said core node in said forwarding table entry indexed by said multicast address of said core node and retransmitting said packet form said other node to said next node.

16. A method for transmitting a data packet from a source node which is not a member of a multicast group of nodes to a multicast group of nodes in a network using a multicast tree of nodes associated with said group comprising the steps of:
   transmitting said data packet containing a multicast address of a core node on said multicast tree from said source node to a node on said multicast tree using unicast routing,
   said packet being transmitted on said multicast tree by the steps of:
   at each node on a multicast tree corresponding to said multicast group, retrieving an entry from a forwarding table maintained at each node and indexed by a multicast address of a core node indicated by said data packet, and transmitting a copy of said data packet to each node indicated by said retrieved entry except a node from which said packet was received.

* * * * *